Figure 4:
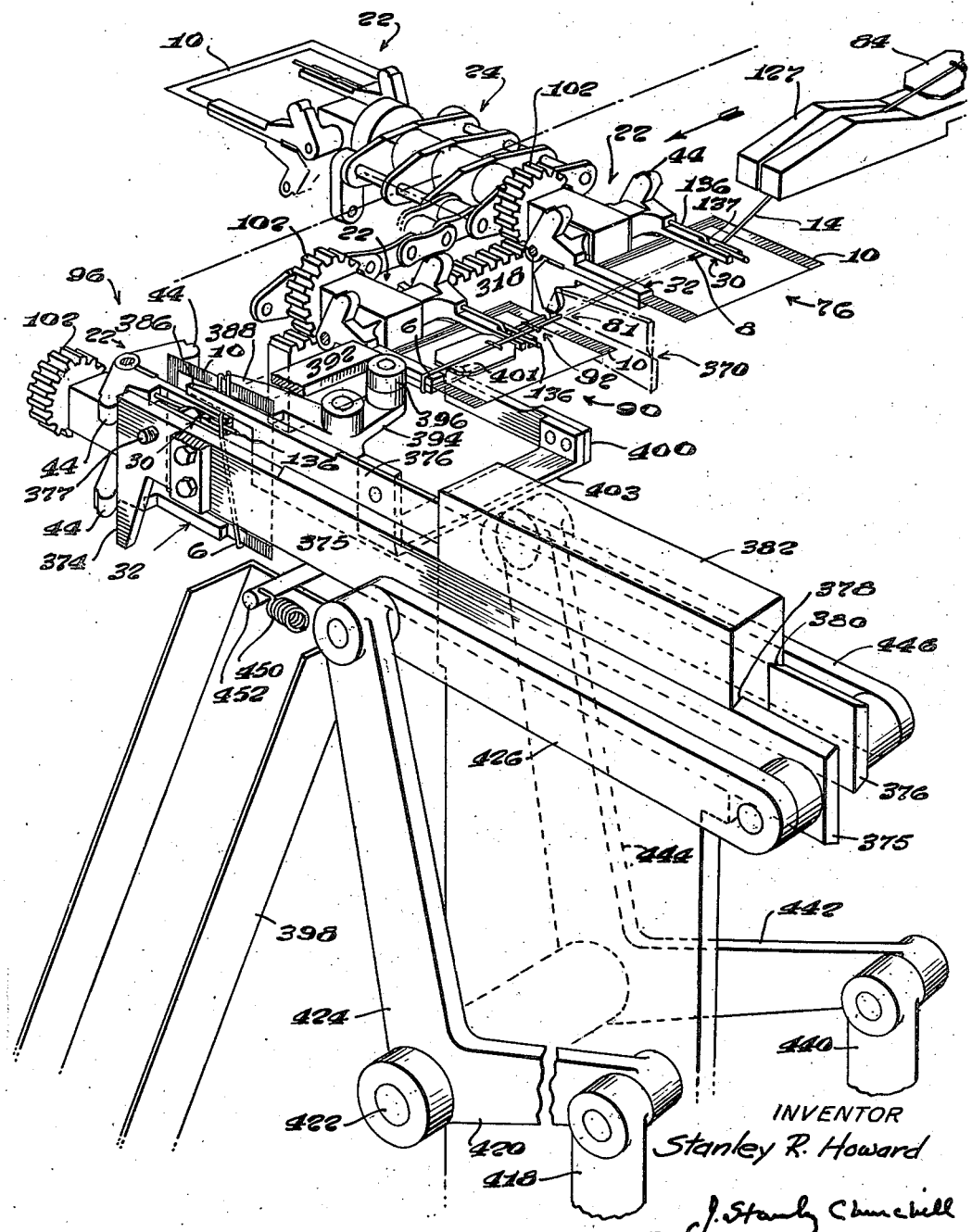

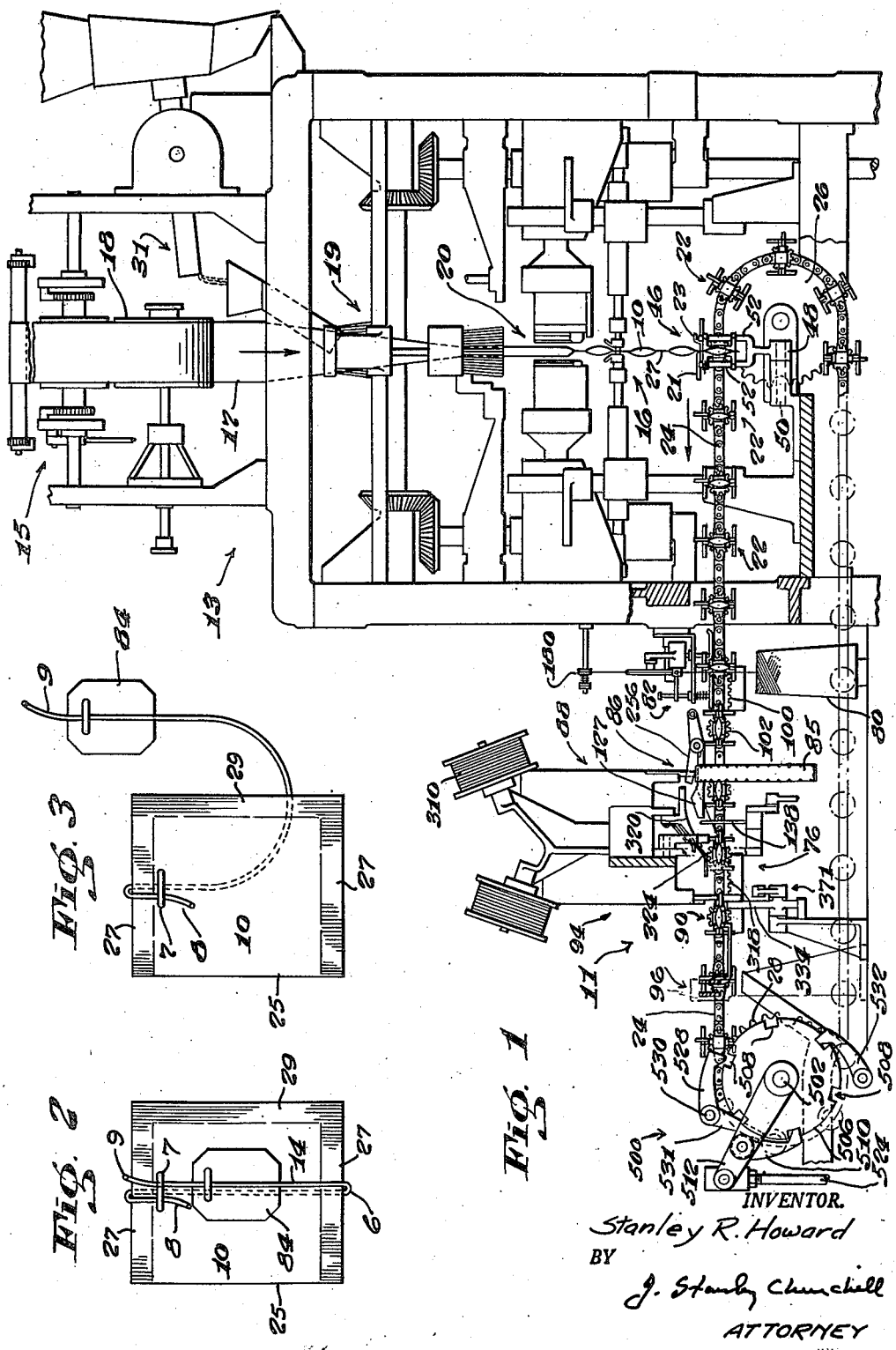

Dec. 28, 1948. S. R. HOWARD 2,457,237
APPARATUS FOR PRODUCING FILLED BAGS
Filed June 4, 1947 3 Sheets-Sheet 2

INVENTOR
Stanley R. Howard
BY J. Stanley Churchill
ATTORNEY

Dec. 28, 1948.  S. R. HOWARD  2,457,237
APPARATUS FOR PRODUCING FILLED BAGS
Filed June 4, 1947  3 Sheets-Sheet 3
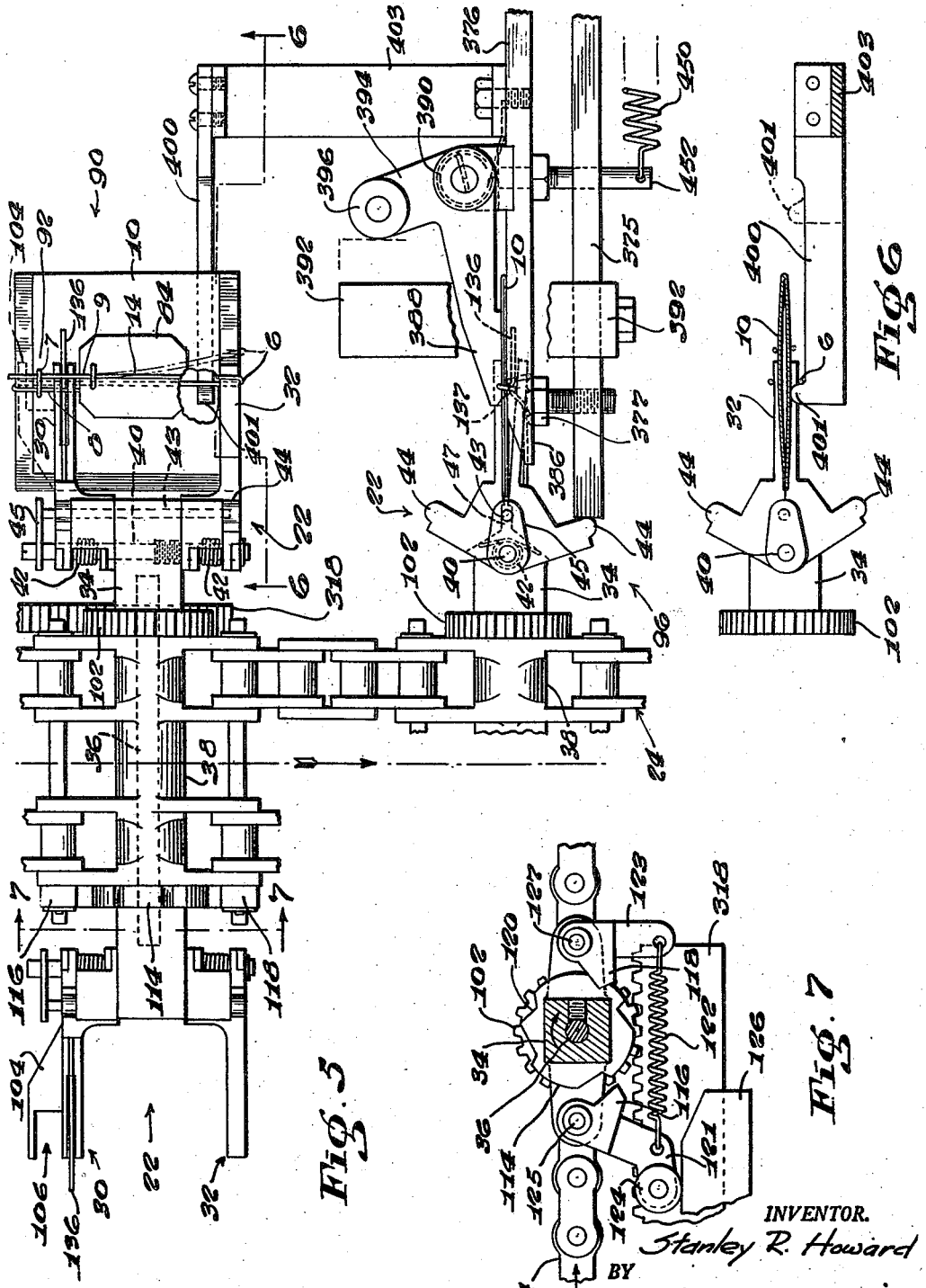

Patented Dec. 28, 1948

2,457,237

UNITED STATES PATENT OFFICE 2,457,237

APPARATUS FOR PRODUCING FILLED BAGS

Stanley R. Howard, Milton, Mass., assignor to Pneumatic Scale Corporation, Limited, Quincy, Mass., a corporation of Massachusetts Application June 4, 1947, Serial No. 752,543

11 Claims. (Cl. 93—2)

This invention relates to apparatus for producing filled bags and particularly to apparatus for attaching a handle comprising a tag and a length of twine to successive bags.

The object of the invention is to provide a novel bag making machine in which provision is made for attaching to the bag, a handle comprising a length of twine and a tag, in a novel, efficient and practical manner whereby to produce non-tangling bags ready for packing and shipment.

A further object of the invention is to provide novel mechanism for use with bag making machines, to attach to successive bags a handle comprising a length of twine and a bag, in a novel, efficient and practical manner.

With these general objects in view, and such others as may hereinafter appear, the invention consists in the bag making apparatus and in the apparatus for attaching to a bag a handle comprising a tag and a length of twine, and in the various structures, arrangements and combinations of parts hereinafter described and particularly defined in the claims at the end of this specification.

In the drawings illustrating the preferred embodiment of the invention Fig. 1 is a side elevation of apparatus for forming, filling, closing and tagging tea bags and embodying the present invention; Fig. 2 is a front view of a bag provided with a handle comprising a tag and a length of twine connecting the tag and the bag as produced by the present apparatus; Fig. 3 is a similar view showing the tagged end of the twine detached from the bag for use by the consumer; Fig. 4 is a perspective view of the handle attaching and bag withdrawing portion of the apparatus shown in Fig. 1; Fig. 5 is a plan view of the bag withdrawing mechanism; Fig. 6 is a detail view of the loop releasing mechanism as viewed from the line 6—6 of Fig. 5; and Fig. 7 is a cross sectional detail view taken on the line 7—7 of Fig. 2.

In general, the present invention relates to apparatus for attaching a handle comprising a tag and a length of twine to an infusion bag and particularly to a paper tea bag of the envelope or pillow type such as may be produced in the machine illustrated and described in the United States Patent No. 2,385,229, issued to William S. Patterson, September 18, 1945. Such infusion bags are preferably produced in strip form by folding an elongated web longitudinally; simultaneously sealing the strip transversely and along the adjacent longitudinal edge to form a bag section; and then filling the bag section through the open top. Thereupon, in the operation of the machine, the strip is intermittently advanced one bag length and a succeeding and similar sealing operation closes the top of the filled bag section and forms a succeeding connected bag section. The bags thus formed are advanced to bag severing mechanism which operates to sever the strip through successive transverse sealed portions to form individual sealed bags.

The bag forming material preferably comprises a porous, fibrous material containing a thermoplastic, pressure responsive, binding material so that when two layers or plies of the material are brought together and subjected to the application of heat and pressure, they will become and remain adhesively united. As illustrated in Fig. 2, the individual bags thus formed each comprises a rectangular-shaped envelope 10 provided with a charge of the commodity, the bag being closed on one side by the folded edge 26 and heat sealed along the opposed marginal edge 29 and along the upper and lower transverse edges 27.

When the apparatus herein illustrated is utilized with such a machine, successive bags thus severed from the strip may be grasped by successive grippers attached to and movable with an intermittently operated carrier chain arranged to move the bag through the various stations of operation for attaching the handle to each individual bag in a manner such as to detachably secure the handle in proximity to the bag whereby to produce a tagged bag offering minimum liability of entanglement with other similar bags when packed in a container.

In practice, one end 8 of the twine 14 is placed and yieldingly retained in a supporting gripper, indicated generally at 22, and adjacent one edge of the bag and a tag 34 is secured adjacent the other end of the twine leaving a short length of twine 9 extending beyond the tag. The twine is then wound once about the bag and about the gripper supporting the bag to dispose the tag flat against the bag and to present the short length of twine 9 extending beyond the tag in proximity to the first end 8 of the twine and adjacent the same edge of the bag. Both ends of the twine are then simultaneously secured to the edge of the bag by suitable fastening means such as a staple 7 as will be hereinafter more fully described. In practice, the short extended end 9 of the twine may be pulled from under the fastening means 7 by the consumer and the twine unwound and extended for use as a handle in the usual manner.

Provision is made in the preferred embodiment of the invention for withdrawing the bag from its supporting gripper 22 and discharging the bag from the machine, and, in the operation of the machine, the grippers are arranged to be opened slightly to free the bag. Since the twine is looped about the jaws of the gripper, opening of the jaws would increase the tension in the twine at this time unless relieved, and, as herein shown, provision is made for releasing the loop 6 from one end of the gripper preferably at the station preceding the withdrawing station to relieve the tension on the twine and to facilitate withdrawal of the bag. Provision is also made in the preferred embodiment of the invention for releasing the end of the twine yieldingly retained in the gripper adjacent said one edge of the bag whereby to entirely free the bag and the twine from the gripper to permit withdrawal of the bag without injury thereto.

The present apparatus for attaching a tag to a bag is indicated herein as embodied in a duplex type machine provided with simultaneously operated mechanisms for simultaneously attaching a handle in the described manner to each of two bags and for simultaneously withdrawing the bags from their respective grippers during the operation of the apparatus.

Referring now particularly to Fig. 1, the present tagging apparatus indicated generally at 11 is herein illustrated as embodied in a bag making machine indicated generally at 13 in which provision is made for forming a series of connected filled and sealed bag sections 10 in strip form.

In general, the present bag forming and filling machine is provided with web withdrawing mechanism, indicated generally at 15, arranged to withdraw a predetermined length of web or bag forming material 17 from a supply roll 18 thereof. The web of bag forming material 17 is then advanced past bag forming mechanism, indicated generally at 19 which operates to fold the web longitudinally along a medial line to bring together the two half sections of the web preparatory to forming a strip of connected bags. The bag forming material is preferably drawn over the bag forming mechanism 19 by gripping and advancing mechanism indicated generally at 16 operative to advance the strip one bag length each cycle of operation of the machine and to present the strip in operative relation to bag sealing mechanism 20 arranged to simultaneously seal the strip along the transverse zone 27 and the adjacent longitudinal zone 29 during each sealing operation to form a series of connected bag sections.

Upon sealing a bag section along the transverse and longitudinal zones as above described, provision is made for introducing a predetermined amount of the commodity, such as tea, through the open edge of the web and between the fold of a partially formed bag section. The bag filling mechanism, indicated generally at 31, is operative to deposit successive charges of the commodity into successive bag sections in timed relation to the operation of the strip advancing and heat sealing mechanisms, and, in the operation of the machine, the open top of a bag which has been provided with a charge of the commodity during one cycle of operation is closed during a succeeding cycle of operation. The heat sealing and bag filling mechanisms, 20 and 31 respectively, are preferably timed to operate and seal the bottom and side of the bag immediately prior to the operation of filling the bag. Thereupon, the strip is intermittently advanced to bag severing mechanism comprising blades 21, 23 which operate to sever the strip through successive transverse sealed portions 27 to form individual filled and sealed bags. For a further and more detailed description of the construction and mode of operation of the bag making mechanism reference is made to the United States Patent No. 2,385,229, issued to William S. Patterson, September 18, 1945.

In the operation of the tagging apparatus successive bags 10 thus formed by the bag forming and filling machine and severed from the strip are arranged to be received in successive gripper units 22 which, as herein shown, are carried by and movable with an intermittently operated carrier chain 24 arranged to run over sprockets 26, 28 disposed at either end of the apparatus, one of which, 28, may be intermittently rotated in timed relation to, and, through connections from the bag making mechanism and which may include a pawl and ratchet type of indexing mechanism, indicated generally at 500. The sprocket 28 may be fast on the shaft 502 and a ratchet disc 506 also fast on the shaft is provided with a plurality of spaced notches 508 in the periphery thereof which are arranged to be successfully engaged by a spring pressed driving pawl 510 pivotally carried by an arm 512. The arm 512 is rockingly mounted on the end of the shaft 502 and is arranged to be rocked to effect intermittent rotation of the disc 506 through cam operated connections driven from the bag making mechanism and including a link 524 connected to the arm 512. A second spring pressed pawl 528 comprising an indexing pawl is pivotally mounted at 530 and is arranged to drop into a notch 508 when the driving pawl 510 reaches the end of its advancing stroke. As herein shown, the indexing pawl 528 is provided with a tail portion 531 arranged to be engaged by the hub of the driving pawl to lift the indexing pawl out of its notch upon the return stroke of the driving pawl 510 and to hold the pawl 528 out of engagement with the disc 506 and notch 508 during the initial portion of the advancing stroke. A third spring-pressed pawl 532 is arranged to drop into a notch 508 at the end of the advancing stroke to prevent reverse movement of the disc 506 during the retracting stroke of the driving pawl arm 512.

As above stated, the various mechanisms for operation upon the bags may and preferably will comprise duplicate units arranged to operate simultaneously to perform similar operations upon two bags, and, as herein shown, the carrier chain 24 is provided with similar gripper units 22 upon both sides thereof. In the following description the mechanisms for performing the various operations for attaching a handle to a bag will be described as applied to a bag disposed in one of the gripper units 22 carried on one side of the chain, it being understood that duplicate mechanisms operated through common driving instrumentalities may be arranged to perform similar operations on a bag disposed in the gripper unit 22 carried on the other side of the chain.

As best shown in Fig. 5, each gripper unit 22 comprises two pairs of cooperating jaws 30, 32 which are pivotally mounted on a stud 40 fixed in and extending through a rectangular hub member 34 secured to a shaft 36 journalled in a link member 38 attached to and forming a part of the carrier chain 24. Each pair of cooperating jaws 30, 32 is normally retained in its closed position by a coil spring 42, and each jaw is provided with an angularly extended abutment 44 by which the jaws may be opened by pressure exerted thereagainst. The jaws are arranged to rest against a stop rod 43 in order to retain them in alignment with each other and at right angles to the chain 24 when in their closed position. The stop rod 43 is supported by a plate 45 secured at one end of the pivot stud 40 extending between the lower ends of the jaws, the latter being recessed, as indicated at 47 for this purpose.

As herein shown, provision is made for opening the jaws 30, 32 of successive gripper units 22 at the bag receiving station, indicated generally at 46, to permit the endmost bag section of the strip to be advanced therebetween and for thereafter closing the jaws upon the bag whereupon the bag is severed from the strip by the shear blades 21, 23. The jaw opening mechanism, as shown in Fig. 1, may include a cam operated arm 48, pivotally mounted at 50, and provided with spaced fingers 52 arranged to engage the abutments 44 to effect opening of the jaws, the latter being spring closed upon the bag when the arm is rocked away from the abutments 44.

In the continued operation of the apparatus, the gripper unit and the bag carried thereby are moved through the apparatus to the various mechanisms for attaching the handle, and, during a part of its movement from the bag receiving station 46 to the station indicated generally at 76, provision is made for rotating the gripper unit from its vertical bag receiving position to a horizontal position in which position a length of twine 14 extending from a preceding bag is inserted and yieldingly held in one of the jaws 30 of the gripper adjacent one edge of the bag. The mechanism for effecting rotation of the gripper unit to dispose the bag in a horizontal position includes a stationary gear rack 100 secured to the carrier frame and which is arranged to cooperate with a gear 102 fast on the gripper shaft 36 as shown in Fig. 5.

Referring to Fig. 7, in order to retain the gripper unit 22 in the position to which it is rotated after leaving the rack, a pawl and ratchet mechanism may be provided at the opposite end of the gripper unit which includes a ratchet 114 fast on the shaft 36 and two pawls 116, 118 which are held by a spring 122 in engagement with suitable notches 120 formed in the periphery of the ratchet 114. The spring 122 extends between the pawl arms 121, 123 and the latter are pivotally mounted on link pins 125, 127 disposed on opposite sides of the shaft 36. As herein shown, one of the pawl arms 121 is provided with a roller 124 arranged to engage a stationary cam piece 126 secured to the carrier frame in order to effect disengagement of the pawl 116 from its ratchet at the time the gear 102 engages the rack and to permit the unit to rotate, the pawl 118 being permitted to slip out of its notch at this time, the notches being disposed with relation to the rack to permit the pawls to fall into engagement with their respective notches to retain the grippers in their rotated position when they leave the rack.

The bag thus disposed in its horizontal position is now advanced to station 76 at which station provision may be made for inserting the length of twine extending from a previous bag into the jaw 30. In order to receive and yieldingly retain the twine in the jaw 30 the latter is provided with a spring arm 136 having an offset twine engaging portion 137 arranged to extend into a slot formed in the jaw, and in practice, the spring arm may be pressed downwardly out of the slot to receive the length of twine 14 between the arm and its jaw 30 whereupon the spring may be released to grip the twine. The twine at this time extends from the preceding bag, at station 76, across the gripper unit 22 into which it is to be inserted and then between a slotted guide member 127 to the twine controlling mechanism, indicated generally at 82. The twine thus extended may be pushed under the open spring arm 136 by a cam operated finger 138 whereupon the spring arm 136 is permitted to close to yieldingly retain the twine between the spring arm 136 and its jaw member 30.

The twine connected to the preceding bag and retained in the jaw 30 is then severed at a point indicated at 81 adjacent the edge of the preceding bag, the severing operation being performed by cam operated shears, herein indicated at 370, and suitable connections indicated at 371 in Fig. 1. Provision may then be made for retracting the twine, the twine slipping through the spring arm 136 until the end of the twine is disposed adjacent the edge of the bag to be tagged and still retained under the spring arm 136, as clearly shown in Fig. 4. The twine thus severed and retracted by the twine control mechanism and yieldingly held by the spring arm 136 under the jaw 30 extends through the slotted guide member 127, past the tag stapling mechanism 88 and then around suitable guide rollers to an overhead roller 180 and to the supply roller 80.

A tag 84 may now be stapled to the extended length of twine at a point spaced from the bag. As herein shown, the tags 84 are supplied in strip form from a roll 85 thereof, the strip being guided through the tag feeding and severing mechanism indicated generally at 86, to be fed into operative position to the twine and to the stapling head, indicated generally at 88, the endmost tag being severed by a cam operated shear blade 256. The stapling unit 88 may be of any usual or preferred from supported above and in operative relation to the tag and twine and arranged to feed and cut the staples from a wire supply carried by a roll 310.

From the description thus far, it will be observed that the bag and the twine are now disposed in the condition illustrated in Fig. 4, with the free end 8 of the twine under the jaw 30 and the extended end of the twine provided with a tag stapled thereto. In the continued operation of the apparatus, the gripper unit 22 is now advanced and rotated to effect winding of the twine about the bag and the supporting gripper. This operation is effected by a rack 318 secured to the carrier frame and arranged to cooperate with the gear 102 of the gripper unit. When the gripper unit comes to rest at station 76, the gear 102 is disposed in engagement with the end of the rack 318 so that upon intermittent movement of the carrier chain 24 to the next station of operation the gripper unit is rotated 360° to assume the position indicated at 90 in Fig. 1 with the bag in a horizontal position and the twine wound once about the bag, the tag being disposed flat against the bag and under the twine as illustrated. It will be observed that one of the jaws 30 is provided with an extended portion 104 having an opening 106 to accommodate the stapling operation and that the outer edge of the extended portion 104 extends substantially to the adjacent edge of the bag, thus providing a rigid edge over which the twine is wound, the twine passing around the jaws 32 at the opposing edge, as clearly shown in Fig. 1.

Provision may also be made for guiding the twine and the tag during the winding operation to prevent twisting of the tag on the twine and to dispose the tag as described. As herein shown at the start of the winding operation the twine extends from under the jaw 30 upwardly through the slotted guide 127 with the tag attached to the extended end, and, upon rotation of the gripper unit the twine is pulled along with the bag and the tag passes over the upper surface of the guide 127 and under an upper guide member 320 arranged to cooperate with the guide 127 to maintain the tag in a substantially horizontal position during the passage of the tag therebetween. When the tag attached to the twine is drawn beyond the guides 127, 320 it engages a flexible guide member 324 which serves to keep the tag from twisting on the twine through the different positions which the twine and tag assume during the rotation of the bag.

Provision is now made for stapling the twine to the bag by a bag stapling unit 94, the staple being arranged to embrace both the free end 8 of the twine held under the jaw 30 and the extended portion 9 thereof as indicated at 92 in Fig. 4, and, simultaneously therewith or immediately thereafter the extended length of twine is arranged to be severed adjacent the bag, as indicated at 81, as above described, to be again retracted into operative position to the succeeding bag. The stapling unit 94 may be similar in construction and mode of operation to the tag stapling unit 88 above described, and may include a cam operated anvil 334 movable into and out of cooperating relation to the stapling mechanism. During the stapling operation, the stapling unit 94 and the cooperating anvil 334 are in alignment with the opening 106 provided in the extended portion 104 of the jaw 30 to permit the twine to be stapled to the bag as described.

As illustrated herein, the gear 102 of the gripper unit 22 is in mesh with the rack 318 during the stapling operation so that upon intermittent movement of the gripper unit to the next station of operation, initial movement thereof will effect rotation of the gripper unit 90° to dispose the bag in a vertical position whereupon the gear 102 rides off the end of the rack.

From the description thus far it will be observed that a handle comprising a tag and a length of twine connecting the tag and the bag has been secured to the bag with the handle wound about the bag and about the gripper supporting the bag, and, that the gripper unit has been rotated 90° to dispose the same in a vertical position preparatory to withdrawing the completed bag therefrom.

At the next station of operation indicated generally at 96, the bag is withdrawn from the gripper and discharged from the machine and, as herein shown, the bag withdrawing mechanism includes a reciprocating bar 375 having an extended portion 374 arranged to engage the abutments 44 on one side of the gripper jaws 30, 32 to effect a slight opening thereof, and, a second reciprocating bar 376 having provision for grasping the bag and withdrawing it from the gripper while the jaws are in their open position.

The reciprocating bars 375, 376 are slidingly supported in grooves 378, 380, formed in a bracket 382 attached to the machine frame, and, are arranged to be reciprocated through cam operated connections including a bell crank pivotally mounted at 422 having one arm 424 connected by a link 426 to one end of the reciprocating bar 375, the second arm 420 being connected to a cam operated reciprocatory link 418. The bar 376 is similarly but independently operated through a bell crank, also pivotally mounted at 422, having one arm 444 connected by a link 446 to the bar 376, the second arm 442 being connected to a cam operated reciprocatory link 440. A spring 450 connected to a stud 452 extending from the bar 376 is provided to urge the bar into a retracted position.

As herein shown, the bag withdrawing bar 376 is provided with an extended portion 386 which is arranged to engage one face of the bag adjacent the upper edge thereof and substantially in alignment with the opening 106 of the extended portion 104 of the gripper, and, a cooperating finger 388 pivotally mounted on the bar 376 is arranged to engage the opposite face of the bag and cooperates with the bar to grasp therebetween the bag and the twine looped thereabout. The pivotally mounted finger 388 is normally urged into bag gripping position by a spring 390, and is arranged to be rocked into and out of bag gripping position by engagement with a bar 392 carried by and extending from the reciprocating bar 375. The pivotal finger 388 is provided with an arm 394 which carries a roller 396 arranged to cooperate with the extended bar or cam piece 392.

In the operation of the device, both bars 375, 376 are advanced into operative position to the bag and gripper whereupon the bar 376 comes to rest and the bar 375 is further advanced into engagement with the abutments 44 to effect opening of the jaws, this movement also advancing the bar 392 to permit the finger 388 to close upon the bag. During the extended movement of the bar 375, the head of a bolt 377 carried thereby is arranged to engage the spring arm 136 so that upon opening of the jaw 30, the spring arm will be held back thus releasing the upper end of the loop of twine from the jaw to permit withdrawal of the bag. Thereupon, the bar 376 is retracted to withdraw the bag from the gripper and to dispose it immediately above a guide chute 398 at which time the bar 375 is retracted to present the cam piece 392 into engagement with the roller 396 to effect rocking the finger 388 and release of the bag into the chute 398.

It will be observed that prior to arriving at the withdrawing station, the twine is looped about the jaws 32 at one end and about the extended portion 104 at the opposite end so that should the jaws be opened while thus held the tension in the twine would be increased to an extent such as to interfere with the withdrawing operation. In order to avoid this condition, provision is made for drawing the loop 6 off the end of the jaws 32 at the station preceding the bag withdrawing station whereby to facilitate subsequent withdrawal of the bag from the gripper when the jaws are opened.

As herein illustrated, the provision for drawing the loop 6 off the end of the jaws 32 at the station 76 preceding the withdrawing station comprises a bar 400 having a rounded hook portion 401 formed thereon and which is carried by a tie piece 403 attached to and extended from the reciprocatory bag withdrawing bar 376. In operation, as the bar 376 is advanced into operative position to withdraw a bag at the withdrawing station, the extended bar 400 carried thereby is presented into the path of the preceding bag at station 90 just before the gripper comes to rest in its horizontal position during its rotation through 360° as it is advanced from station 76 to station 90. Thus, the bag carried by the gripper will rest on top of the bar 400 with the hooked portion 401 disposed behind the loop 6 and adjacent the inner edge of the jaw 32. It will be observed that the jaws 32 are relatively short with relation to the length of the bag, the ends of the jaws extending only slightly beyond the center of the bag so that when the reciprocatory bar 376 is retracted during the bag withdrawing operation, the hook member 401 carried thereby will engage the hoop and pull it off the ends of the jaws 32. It will be understood that the twine looped about the jaws is relatively taut when engaged by the hooked portion 401 providing a slight tension in the loop so that it will remain in engagement with the hook while it is being drawn off the jaws. Immediately after the loop is released from the jaws the twine becomes slack thus permitting the rounded hook portion to free itself from the loop, the loop remaining just beyond the jaws and in engagement with the edge of the bag, as illustrated by the dotted lines in Fig. 5.

From the above description, it will be observed that the present invention provides a novel and improved apparatus for producing a bag having a handle comprising a tag and a length of twine connecting the tag and the bag, with the handle wound about the bag in a manner such as to reduce to a minimum entanglement with adjacent bags of a group thereof packed in a container.

While the preferred embodiment of the invention has been herein illustrated and described it will be understood that the invention may be embodied in other forms within the scope of the following claims.

Having thus described the invention, what is claimed is:

1. In apparatus for producing infusion bags, in combination, bag supporting means arranged to receive and support a bag, means for attaching a handle comprising a tag and a length of twine to the bag including means for relatively moving the twine and the bag to loop the twine about the bag and its support, means for withdrawing the bag from its support, and means for releasing the loop from the support prior to the withdrawing operation.

2. In apparatus of the character described, in combination, bag supporting means comprising a gripper arranged to receive and support a bag, means for attaching a handle comprising a tag and a length of twine to the bag including means for relatively moving the twine and the bag to loop the twine about the bag and its supporting gripper, means for withdrawing the bag from the gripper, and means for releasing the loop from the gripper prior to withdrawal of the bag.

3. For use with a bag forming, filling and closing machine, bag supporting means arranged to receive and support a bag, means for attaching a handle comprising a tag and a length of twine to the bag including means for relatively moving the twine and the bag to loop the twine about the bag and its support, means for withdrawing the bag from its support, and means for releasing the loop from the support prior to withdrawal of the bag.

4. The combination with means for supporting a filled and sealed bag having a handle comprising a tag and a length of twine looped about the bag and its support, of means for withdrawing a completed bag from its support, and means for releasing the loop from the support prior to the withdrawing operation.

5. In apparatus of the character described, in combination, bag supporting means comprising a gripper having jaws arranged to receive and support a bag therebetween, means for attaching a handle comprising a tag and a length of twine to the bag including means for rotating the gripper to effect winding of the twine about the bag and its support, means for withdrawing the completed bag from its support including means for opening the jaws of the gripper, and means for removing the twine looped about one end of said gripper jaws prior to the withdrawing operation whereby to relieve the tension in the twine and facilitate withdrawal of the bag.

6. In apparatus of the character described, in combination, bag supporting means comprising a gripper having jaws arranged to receive and support a bag therebetween, means for attaching a handle comprising a tag and a length of twine to the bag including means for rotating the gripper to effect winding of the twine about the bag and its support, a yieldable member cooperating with a jaw to retain the twine adjacent thereto during the winding operation, means for withdrawing the completed bag from its support, and means for releasing the twine from said yieldable member to facilitate withdrawal of the bag.

7. In apparatus of the character described, in combination, bag supporting means comprising a gripper having jaws arranged to receive and support a bag therebetween, means for attaching a handle comprising a tag and a length of twine to the bag including means for rotating the gripper to effect winding of the twine about the bag and its support, a spring arm cooperating with a jaw to retain the twine adjacent thereto during the winding operation, means for withdrawing the completed bag from its support including means for opening the jaws of the gripper, and means carried by said jaw opening means and engageable with said spring arm arranged to free the twine from the jaw to permit withdrawal of the bag.

8. In apparatus of the character described, in combination, bag supporting means comprising a gripper having jaws arranged to receive and support a bag therebetween, means for attaching a handle comprising a tag and a length of twine to the bag including means for rotating the gripper to effect winding of the twine about the bag and its support, a yieldable member cooperating with a jaw to retain the twine adjacent thereto during the winding operation, means for withdrawing the completed bag from its support, means operative prior to the withdrawing operation for removing the twine looped about one end of said gripper jaws to relieve the tension in the twine, and means for releasing the twine from said yieldable member whereby to free the twine from the gripper and facilitate withdrawal of the bag.

9. In apparatus of the character described, in combination, bag supporting means comprising a gripper having jaws arranged to receive and support a bag therebetween, means for attaching a handle comprising a tag and a length of twine to the bag including means for rotating the gripper to effect winding of the twine about the bag and its support, a spring arm cooperating with a jaw to retain the twine adjacent thereto during the winding operation, means for withdrawing the completed bag from its support including means for opening the jaws of the gripper, means operative prior to the withdrawing operation for removing the twine looped about one end of said gripper jaws to relieve the tension of the twine thereabout, and means carried by said jaw opening means and engageable with said spring arm arranged to free the twine from said jaw to facilitate withdrawal of the bag.

10. The combination with means for supporting a filled and sealed bag having a handle comprising a tag and a length of twine looped about the bag and its support, a portion of the twine being yieldingly held in said support, of means for withdrawing the completed bag from its support, means operative prior to the withdrawing operation for removing the loop from the support, and means also operative prior to the withdrawing operation for releasing the yieldingly held portion of the twine from the support whereby to facilitate withdrawal of the bag.

11. In apparatus for producing infusion bags, in combination, bag supporting means arranged to receive and support a bag, means for attaching a handle including a length of twine to the bag comprising means for relatively moving the twine and the bag to loop the twine about the bag and its support, means for withdrawing the bag from its support, and means for releasing the loop from the support prior to the withdrawing operation.

STANLEY R. HOWARD.

No references cited.